United States Patent [19]
Hoffman et al.

[11] Patent Number: 5,715,390
[45] Date of Patent: Feb. 3, 1998

[54] METHOD AND APPARATUS FOR PROVIDING UPGRADES IN ELECTRICITY METERS

[75] Inventors: Mark E. Hoffman, Rochester, N.H.; John E. Hershey, Ballston Lake, N.Y.

[73] Assignee: General Electric Company, New York, N.Y.

[21] Appl. No.: 564,971

[22] Filed: Nov. 30, 1995

[51] Int. Cl.⁶ .............................. G06F 15/20; G06F 7/04; H04L 9/32

[52] U.S. Cl. .......................... 395/188.01; 395/188.01; 395/186; 380/23; 380/25; 364/483; 340/870.02; 324/142

[58] Field of Search .................... 340/870.02; 364/483, 364/464.04; 395/188.01, 186; 380/23, 25

[56] References Cited

U.S. PATENT DOCUMENTS

| | | | |
|---|---|---|---|
| 4,489,384 | 12/1984 | Hurley et al. | 364/483 |
| 4,542,469 | 9/1985 | Brandyberry et al. | 364/483 |
| 4,599,489 | 7/1986 | Cargile | 380/4 |
| 4,908,769 | 3/1990 | Vaughan et al. | 364/483 |
| 4,959,861 | 9/1990 | Howlette | 340/4 |
| 5,077,660 | 12/1991 | Haines et al. | 364/464.02 |
| 5,131,091 | 7/1992 | Mizuta | 395/186 |
| 5,369,401 | 11/1994 | Haines | 364/464.02 |
| 5,369,709 | 11/1994 | Foreman et al. | 380/51 |
| 5,400,319 | 3/1995 | Fite et al. | 369/275.5 |
| 5,402,492 | 3/1995 | Goodman et al. | 380/25 |
| 5,428,351 | 6/1995 | Lee, Jr. et al. | 340/870.02 |
| 5,467,286 | 11/1995 | Pyle et al. | 364/483 |
| 5,541,904 | 7/1996 | Fite et al. | 369/58 |
| 5,555,508 | 9/1996 | Munday et al. | 364/492 |

OTHER PUBLICATIONS

EMFPLUS Software User Guide Manual—Jun. 1993.
Dallas Semiconductor DS1425 MultiButton—Aug. 1993.
Rainbow Technologies—Sentinel SuperPro—1994.

*Primary Examiner*—Robert W. Beausoliel, Jr.
*Assistant Examiner*—Luan C. Do
*Attorney, Agent, or Firm*—Carl B. Horton; Hanh T. Pham

[57] ABSTRACT

An electricity meter having a protected enabling scheme for activating meter options and upgrades is presented. The meter has a unique serial number, which includes bit-flags indicating which options have already been enabled, stored in the non-volatile RAM. Each option which is not enabled must be requested and a password verified before it can be utilized. At least one password is stored in a read protected location in the non-volatile RAM. The meter is in communication with a computer, e.g., a desktop or laptop type of computer. The password is generated by processing a secret software key and the unique serial number of the meter with an authentication algorithm. The computer is loaded with an upgrade software program, which includes the authentication algorithm. A hardware key which stores a secret software key is attached to a parallel port of the computer. The upgrade software program reads the serial number from the non-volatile RAM in the meter and reads the secret software key from the hardware key, then processes the read secret software key and the read unique serial number of the meter with the stored authentication algorithm to generate at least one password. The password along with an upgrade command are presented to the meter where they are compared to the read-protected password in the meter, and, if there is a match, then the upgrade command initiates codes in the meter to implement one or more stored options or upgrades.

22 Claims, 5 Drawing Sheets

| | | | | | | | | |
|---|---|---|---|---|---|---|---|---|
| Byte | 1: | 0 | 0 | 0 | 0 | 0 | 0 | 0 | 1 |
| Byte | 2: | 0 | 0 | 0 | 1 | 0 | 0 | 0 | 0 |
| Byte | 3: | 0 | 0 | 1 | 1 | 0 | 0 | 0 | 1 |
| Byte | 4: | 0 | 0 | 1 | 1 | 0 | 0 | 1 | 0 |
| Byte | 5: | 0 | 0 | 1 | 1 | 0 | 0 | 1 | 0 |
| Byte | 6: | 0 | 1 | 0 | 1 | 0 | 1 | 0 | 0 |
| Byte | 7: | 0 | 0 | 1 | 1 | 0 | 0 | 1 | 1 |
| Byte | 8: | 0 | 1 | 1 | 1 | 0 | 1 | 1 | 0 |
| Byte | 9: | 0 | 0 | 1 | 1 | 0 | 1 | 0 | 0 |
| Byte | 10: | 1 | 0 | 0 | 1 | 1 | 0 | 0 | 0 |
| Byte | 11: | 0 | 0 | 1 | 1 | 0 | 1 | 0 | 1 |
| Byte | 12: | 1 | 0 | 1 | 1 | 1 | 0 | 1 | 0 |
| Byte | 13: | 0 | 0 | 1 | 1 | 0 | 1 | 1 | 0 |
| Byte | 14: | 1 | 1 | 0 | 1 | 1 | 1 | 0 | 0 |
| Byte | 15: | 0 | 0 | 1 | 1 | 0 | 1 | 1 | 1 |
| Byte | 16: | 1 | 1 | 1 | 1 | 1 | 1 | 1 | 0 |
| Byte | 17: | 0 | 0 | 1 | 1 | 1 | 0 | 0 | 0 |
| Byte | 18: | 0 | 0 | 0 | 0 | 0 | 0 | 0 | 0 |
| Byte | 19: | 0 | 0 | 1 | 1 | 1 | 0 | 0 | 1 |
| Byte | 20: | 0 | 0 | 0 | 0 | 0 | 0 | 0 | 0 |
| Byte | 21: | 0 | 0 | 1 | 0 | 0 | 0 | 0 | 0 |
| Byte | 22: | 0 | 0 | 0 | 0 | 0 | 0 | 0 | 0 |
| Byte | 23: | 0 | 0 | 1 | 0 | 0 | 0 | 0 | 0 |
| Byte | 24: | 0 | 0 | 0 | 0 | 0 | 0 | 0 | 0 |
| Byte | 25: | 0 | 0 | 1 | 0 | 0 | 0 | 0 | 0 |
| Byte | 26: | 0 | 0 | 0 | 0 | 0 | 0 | 0 | 0 |
| Byte | 27: | 0 | 0 | 1 | 0 | 0 | 0 | 0 | 0 |
| Byte | 28: | 0 | 0 | 0 | 0 | 0 | 0 | 0 | 0 |
| Byte | 29: | 0 | 0 | 1 | 0 | 0 | 0 | 0 | 0 |
| Byte | 30: | 0 | 0 | 0 | 0 | 0 | 0 | 0 | 0 |
| Byte | 31: | 0 | 0 | 1 | 0 | 0 | 0 | 0 | 0 |
| Byte | 32: | 0 | 0 | 0 | 0 | 0 | 0 | 0 | 0 |
| Byte | 33: | 0 | 0 | 1 | 0 | 0 | 0 | 0 | 0 |

FIG. 3

| Byte | 30: | 0 | 1 | 0 | 0 | 0 | 0 | 1 | 1 |
|------|-----|---|---|---|---|---|---|---|---|
| Byte | 31: | 0 | 0 | 1 | 1 | 0 | 0 | 1 | 0 |
| Byte | 32: | 0 | 1 | 0 | 0 | 0 | 0 | 0 | 1 |
| Byte | 33: | 0 | 1 | 0 | 0 | 0 | 0 | 1 | 1 |

FIG. 4

| Byte | 30: | 1 | 1 | 0 | 0 | 0 | 1 | 0 | 1 |
|------|-----|---|---|---|---|---|---|---|---|
| Byte | 31: | 1 | 1 | 1 | 0 | 0 | 1 | 1 | 0 |
| Byte | 32: | 0 | 1 | 0 | 0 | 1 | 0 | 1 | 0 |
| Byte | 33: | 1 | 1 | 0 | 1 | 1 | 0 | 1 | 1 |

FIG. 5

METHOD AND APPARATUS FOR PROVIDING UPGRADES IN ELECTRICITY METERS

BACKGROUND OF THE INVENTION

The present invention relates generally to electricity meters. More specifically, the present invention relates to electricity meters with a protected enabling scheme for activating meter options and upgrades.

Electricity meters are well known. These meters can be electro-mechanical based meters whose output is generated by a rotating disk, electronic based meters whose output component is generated electronically, and hybrid meters which use an electronic register in combination with a rotating disk. The electronic meters are typically used for the measurement of kilowatt demand, and/or time of use (TOU) energy consumption. Further, in electricity metering, electric utility companies historically have found it desirable to measure, in addition to total kilowatt-hours (real volt amperes), power factor, KVA, or reactive volt amperes. The aforementioned TOU meters also calculate kilowatt demand. However, the TOU meters also store time and date information, and a rate schedule. The electricity is metered in accordance with the rate schedule for different time periods and days.

For a detailed description pertaining to electricity metering and in particular for detailed information pertaining to the various types of electrical services and distribution systems and the types of meters utilized to perform kilowatt-hour, varhour and Qhour metering, reference is made to the Handbook for Electricity Metering, Eighth Edition, published by the Edison Electric Institute.

Electronic meters having pre-loaded options and upgrades are known in the industry, e.g. the ALPHA meter commercially available from ABB. The pre-loaded upgrades are activated with the use of so-called 'software and hardware keys'. A software program generates a command to activate the desired option or upgrade. However, the command to activate the desired option or upgrade is not enabled until the software and a hardware key are opened. More specifically, the software key is a counter which is decremented each time an upgrade is downloaded to a meter, so that only the number of upgrades purchased can be enabled. The hardware key is a storage medium for the software key described above. Hardware keys are well known, for example one such hardware key is the SentinelSuperPro which is commercially available from Rainbow Technologies. The Sentinel-SuperPro hardware key includes 64 16-bit words of read/write memory. This hardware key memory is commonly used as a counter, similar to the above-describe meter.

A problem with the electronic meters having pre-loaded options and upgrades is the ease with which such options and upgrades can be obtained without purchasing the aforementioned software and keys, after an initial upgrade package is obtained. More specifically, one would simply record the command to activate the desired option or upgrade and later play it back to another meter, thereby activating the same options and updates.

SUMMARY OF THE INVENTION

The above-discussed and other drawbacks and deficiencies of the prior art are overcome or alleviated by the electricity meter with a protected enabling scheme for activating meter options and upgrades of the present invention. In accordance with the present invention, the electronic electricity meter comprises a voltage sensor and a current sensor with the analog outputs thereof presented to an A/D converter, which converts these analog signals to digital signals. The digital signals are presented to a digital signal processor where short interval calculations are performed. These calculations are presented to a microcomputer which is capable of performing demand, TOU (time of use), reactive, KVA and other calculations. The meter further includes RAM and ROM, both of which communicate with the microcomputer. It will be appreciated that both the RAM and ROM are non-volatile so that system information and programming will not be lost during a power interruption or outage. Data, typically cumulative demand, is displayed by a LCD in response to display signals received from the microcomputer. Calibration, testing, programming and other features are accomplished through an optical communications port, which communicates with the microcomputer.

In accordance with the present invention, the ROM includes codes for implementing one or more stored options or upgrades. It will be appreciated that these options or upgrades are stored in the meter at the factory and can be utilized only when purchased and enabled as described herein. Each meter has a unique serial number and bit-flags indicating which options have already been enabled, stored in the RAM. Each option which is not enabled must be requested and a password verified before it can be utilized. It is an important feature of the present invention that the password be based on the serial number, so that the same password cannot simply be recorded and played back to another meter. Further, the password cannot be used to upgrade more than the option(s) selected (and purchased).

A significant advantage of the present invention is that it allows a utility company to significantly reduce the different types of meters it must stock, since the meters of the present invention can be configured on-site to meet specific requirements. Further, the ability to add options provides the utility company greater flexibility in metering electricity use without installing new meters. Moreover, the option enabling scheme of the present invention is provided with a high degree of security to avoid theft of the upgrades.

To enable options or upgrades, the meter is connected for communication with a computer, e.g., a desktop or laptop type of computer. At least one password is stored in the RAM, however the password is not externally readable from the RAM. The password is generated by processing a secret software key and the unique serial number of the meter with an authentication algorithm. The computer is loaded with an upgrade software program, which includes the authentication algorithm. A hardware key is attached to a parallel port of the computer. The hardware key memory is commonly used as counters and such is also employed by the present invention. However, in addition to counting, the hardware key memory stores the secret software key.

The upgrade software program reads the serial number from the RAM in the meter and reads the secret software key from the hardware key. The upgrade software program then processes the read secret software key and the read unique serial number of the meter with the stored authentication algorithm to generate at least one password. The password along with an upgrade command are presented to the meter where they are compared to the read-protected passwords in the RAM of the meter, and, if there is a match, then the upgrade command initiates the ROM codes for implementing one or more stored options or upgrades. The upgrade command identifying the desired option or upgrade is programmed into the upgrade software program. The counter is decremented each time an upgrade is downloaded to a meter, so that only the number of upgrades purchased can be enabled.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
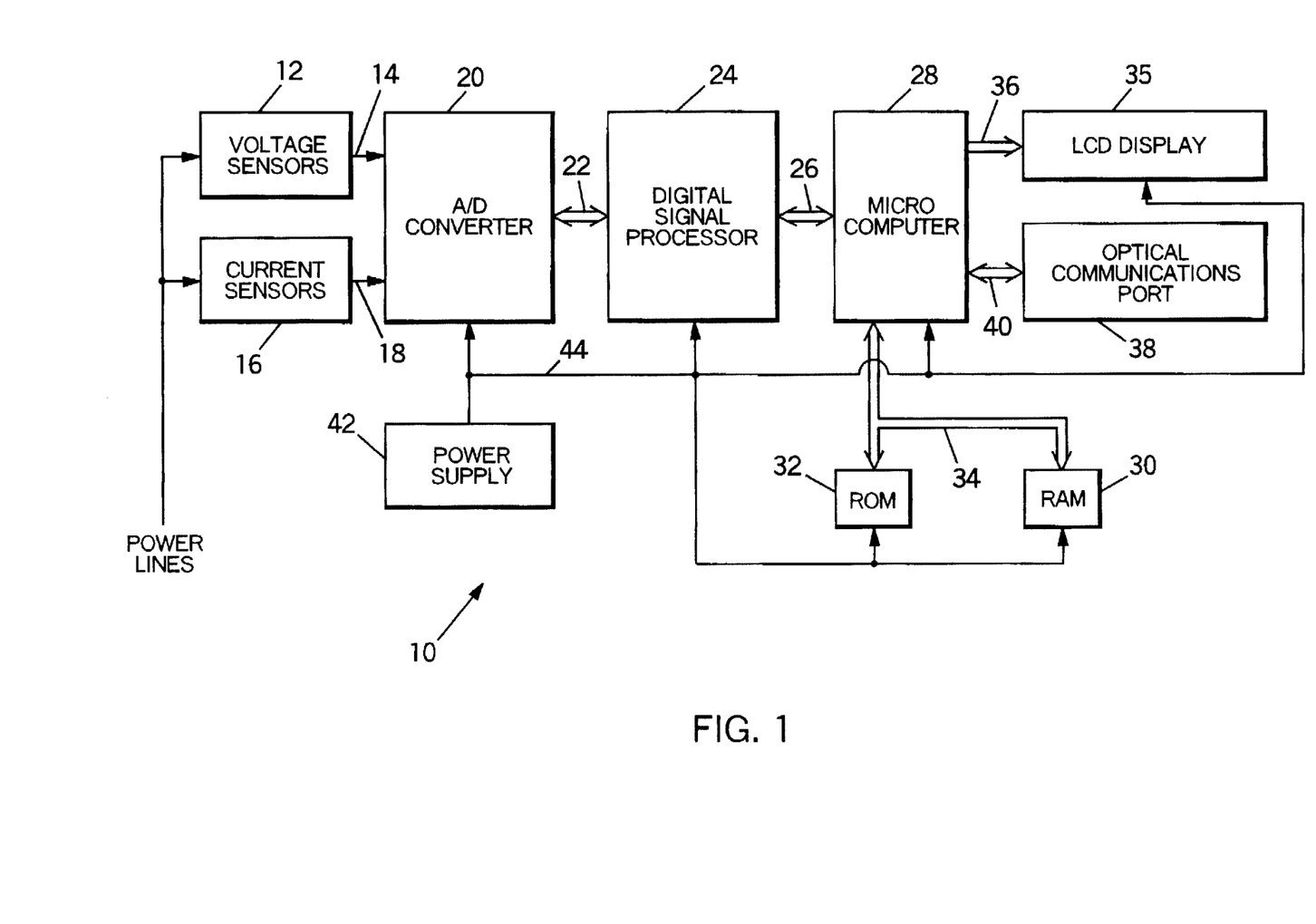
FIG. 1 is a schematic block diagram of an electronic electricity meter in accordance with the present invention.

Referring to FIG. 1, a general schematic of an electronic electricity meter is generally shown at 10. Electronic electricity meter 10 comprises a voltage sensor 12 which provides analog signals indicative of voltage measurements on a signal line 14 and a current sensor 16 which provides analog signals indicative of a current measurements on a signal line 18. The analog signals on line 14 and 18 are presented to an A/D (analog/digital) converter 20, which converts these analog signals to digital signals. The digital signals are presented over a bus 22 to a digital signal processor 24 where short interval calculations are performed. These calculations are presented over a bus 26 to a microcomputer 28 which is capable of performing demand, TOU (time of use), reactive, KVA and other calculations. Meter 10 further includes RAM (random access memory) 30 and ROM (read only memory) 32 both of which communicate with the microcomputer 28 over a control bus 34. It will be appreciated that both the RAM and ROM are non-volatile so that system information and programming will not be lost during a power interruption or outage. Data, typically maximum demand, is displayed by a LCD (liquid crystal display) 35 in response to display signals received from microcomputer 28 over a signal line 36. Calibration, testing, programming and other features are accomplished through an optical communications I/O port 38, which communicates with microcomputer 28 over lines 40. A power supply 42 which is powered by the service electricity, provides appropriate power over a line 44 to the components of meter 10.

In accordance with the present invention, ROM 32 includes codes for implementing one or more stored options or upgrades. It will be appreciated that these options or upgrades are stored in the meter at the factory and can be utilized only when purchased and enabled as described herein. Each meter 10 has a unique serial number stored in RAM 30. In the present example, the serial number is 16 bytes long and includes bit-flags (i.e., an option byte) indicating which options have already been enabled. Each option which is not enabled must be requested and a password verified before it can be utilized. It is an important feature of the present invention that the password be based on the serial number, so that the same password cannot simply be recorded and played back to another meter. Further, the password cannot be used to upgrade more than the option(s) selected (and purchased). In the present example, the password is 4 bytes in length.

A significant advantage of the present invention is that it allows a utility company to significantly reduce the different types of meters it must stock, since the meters of the present invention can be configured on-site to meet specific requirements. Further, the ability to add options provides the utility company greater flexibility in metering electricity use without installing new meters. Moreover, the option enabling scheme of the present invention is provided with a high degree of security to avoid theft of the upgrades.

Figure 2A:
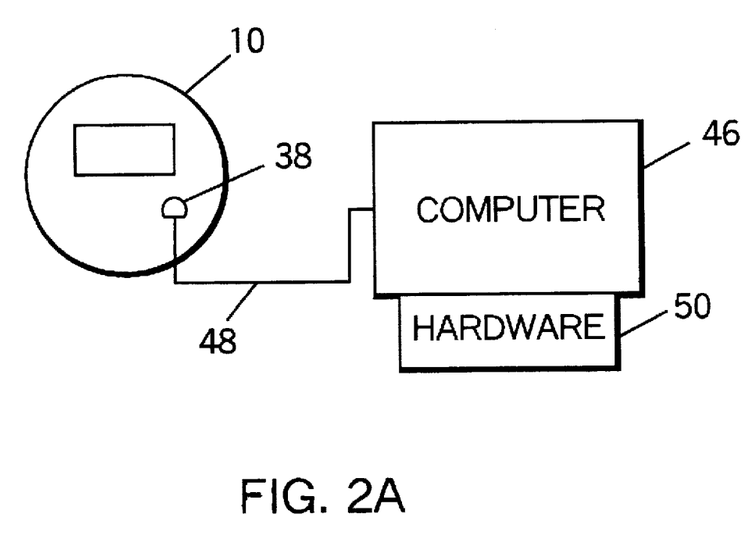
FIG. 2A a diagrammatic view of an option or upgrade enabling scheme of the present invention.

Referring to FIG. 2A, a diagrammatic view of the option enabling scheme of the present invention is generally shown. It will be appreciated that the terms 'option' and 'upgrade' are used interchangeably herein. To enable options or upgrades, meter 10 is connected for communication with a computer 46, e.g., a desktop or laptop type of computer, via a serial data cable 48. Serial data cable 48 is connected to optical communications port 38 on meter 10 an optical I/O port on computer 46, as is well known. Again, the firmware of the meter contains the serial number which is externally readable from RAM 30. Also, at least one password is (e.g., three passwords) is also stored in RAM 30, however the password is not externally readable from RAM 30, i.e., it is read-protected. The password is generated by processing a secret software key and the unique serial number of the meter with an authentication algorithm. Computer 46 is loaded with an upgrade software program, which includes the authentication algorithm. A hardware key 50 is attached to a parallel port of computer 46. Hardware keys are well known, for example one such hardware key is the SentinelSuperPro which is commercially available from Rainbow Technologies. Hardware key 50 includes read/ write memory, e.g., 64 16-bit words. The hardware key memory is commonly used as a counter and such is also employed by the present invention. However, in addition to counting, the hardware key memory stores the secret software key.

Figure 2B:
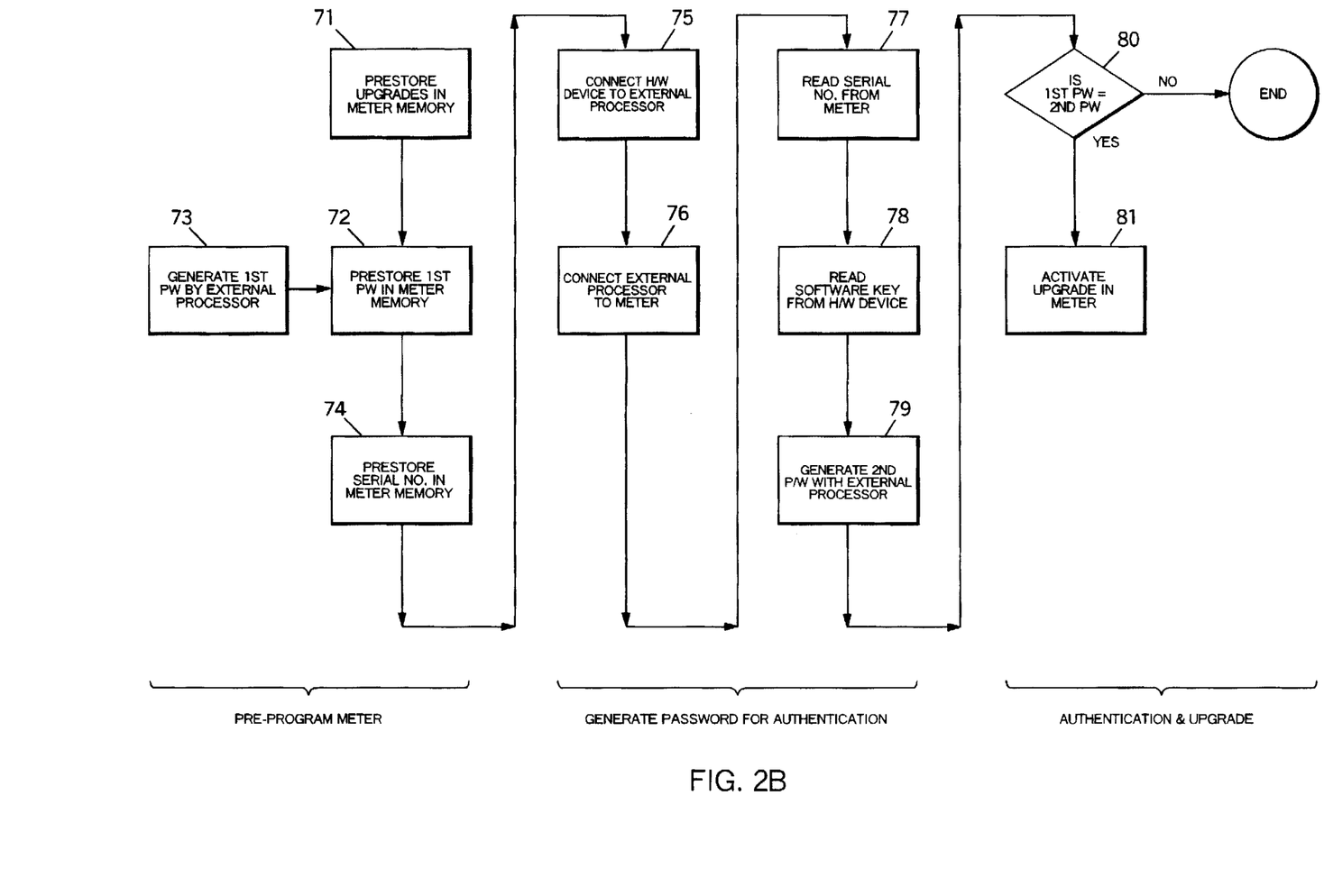
FIG. 2B is a high level flow chart of the process of enabling an option or upgrade in an electricity meter of the present invention.

In FIG. 2B, the process of enabling an option or upgrade in an electricity meter of the present invention is shown. The meter is pre-programmed with the options or upgrades being stored at the factory in 71. At least one password is stored in the RAM of the meter in 72. The password is generated in 73 by processing a software key and a serial number of the meter with an authentication program by a proce4ssor external to the meter. The meter's unique serial number is stored in the meter's RAM in 74.

The upgrade software program reads the serial number from the RAM in the meter and reads the secret software key from the hardware key. The upgrade software program then processes the read secret software key and the read unique serial number of the meter with the stored authentication algorithm to generate at least one password in 79. The password along with an upgrade command are presented to the meter where the password presented is compared to the read-protected password in the RAM of the meter in step 80, and, if there is a match, then the upgrade command initiates the ROM codes for implementing one or more stored options or upgrades in step 81. The upgrade command identifying the desired option or upgrade is programmed into the upgrade software program. The counter is decremented each time an upgrade is downloaded to a meter, so that only the number of upgrades purchased can be enabled.

Accordingly, in order to upgrade a meter three things must be purchased (1) a disk or other medium having the upgrade software program loaded thereon, (2) the hardware key, and (3) upgrade counters in the hardware key. It is assumed that a computer and an optical cable 48 are available as they have other uses with respect to these meters, as mentioned above.

The following described authentication algorithm accepts:

(1) the sixteen byte secret and protected keying variable;
(2) the sixteen byte meter serial number; and
(3) the one byte option code;

and returns a 4 byte authentication password.

In accordance with the authentication algorithm of the present invention, an array of 33 bytes, $B(i,j)$, is defined where i, $1 \leq i \leq 33$, is the byte number and, j, $0 \leq j \leq 7$, specifies the bits within byte i. The least significant bit (LSB) is specified by $j=0$; and the most significant bit (MSB) is specified by $j=7$.

The array is initialized as follows:

(1) the option byte is placed in byte 1 of array B;
(2) the 16 key bytes are placed sequentially into bytes 2, 4, 6, . . . , 32 of array B; and
(3) the 16 serial number bytes are placed into bytes 3, 5, 7, . . . , 33 of array B.

After initialization, the array B is cycled. A single cycle is defined by the following four sequential steps:

(1) the bit-by-bit modulo two sum, S, is computed, of the following bytes in array B: bytes, 1, 2, 3, 4, 10, 11, 14, 16, 17, 18, 19, 26, 28, 29, 30, 31. It will be appreciated that this may also be computed by performing a bitwise exclusive-or (XOR) on all the bytes;

(2) S is added, using normal addition without final carry, to a constant, e.g., 77, 01001101 in binary, with the LSB on the right;

(3) the byte sum produced by the normal addition is end-around rotated by 4 bit positions, i.e., if the sum had resulted in bits $S_7, S_6, S_5, S_4, S_3, S_2, S_1, S_0$, then the byte after the end-around rotation would be $S_3, S_2, S_1, S_0, S_7, S_6, S_5, S_4$; and (4) the contents of byte 2 are placed into byte 1; the contents of byte 3 into byte 2; and so on, until the contents of byte 33 into byte 32; finally, the end-around rotated byte above becomes the new contents of byte 33.

After 330 cycles, the contents of bytes B30, B31, B32, and B33 are defined to be the password corresponding to the specific key, meter serial number, and option.

The authentication algorithm being known will not in of the itself allow recovery of the secret key. Further, if a single bit is changed in the serial number, the option byte, or the key, then the authentication password will change in a difficult to predict fashion.

Figure 3:
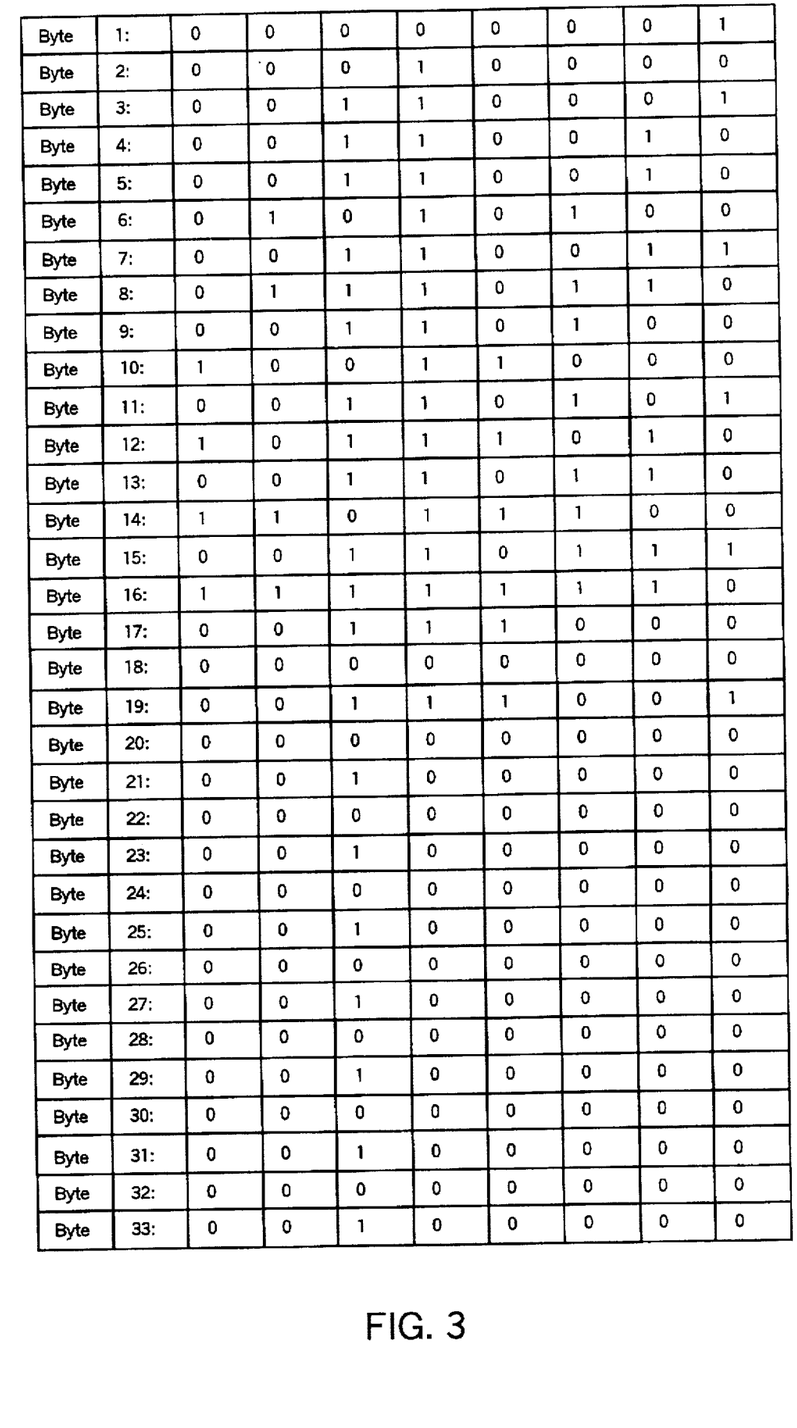
FIG. 3 is a chart of the initialization of a 33 byte array in accordance with an example of the present invention.
Figure 4:
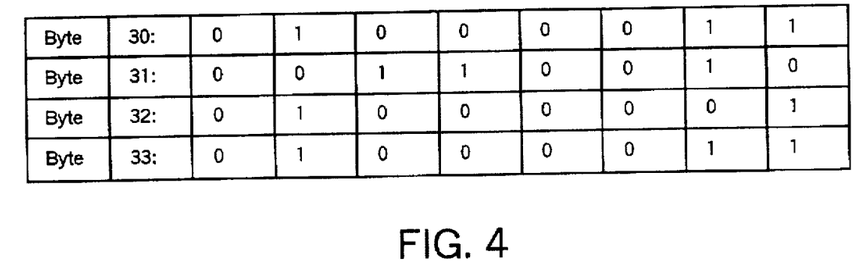
FIG. 4 is a chart of a password resulting from the cycling of the initialization array of FIG. 3 in accordance with the present invention.
Figure 5:
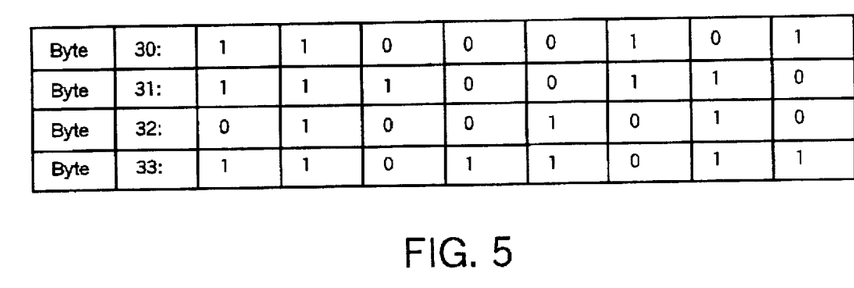
FIG. 5 is a chart of a password resulting from the cycling of the initialization array of FIG. 3 with a one byte change as compared to FIG. 4.

Referring to FIGS. 3–5, an example of the authentication algorithm is presented. FIG. 3 displays the initialization of the 33 byte B-array for the case where:

(1) the 16 byte key in hexadecimal is 10, 32, 54, 76, 98, BA, DC, FE 00, 00, 00, 00, 00, 00, 00, 00;
(2) the serial number is the 16 bytes representing the ASCII characters 1, 2, 3, 4, 5, 6, 7, 8, 9 followed by 7 blanks; and
(3) the option is a single byte of the value 1. Again, the bytes are displayed with the LSB on the right.

The 4 byte password resulting from the cycling of initialized array B (FIG. 3), as described above, is shown in FIG. 4. A 4 byte password resulting from the cycling of initialized array B (FIG. 3), with the exception of the option byte being set to the value 2 instead of 1, is shown in FIG. 5. It will be appreciated that the change in the option status has resulted in a significant change in the password. This is also the case for a small change in the serial number or the key.

This algorithm is easily programmable in machine language or with languages that facilitate bit level programming, such as the C programming language. It will further be appreciated that the cycling step need not be programmed so that the byte contents themselves are shifted but rather cycling can be easily and rapidly implemented with a set of pointers that are updated and reduced modulo 33.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of providing upgrades in an electronic electricity meter, the method comprising the steps of:

(1) pre-storing an upgrade in a memory of the meter, said upgrade requiring activation to allow use thereof, (2) pre-storing a first password in a memory of the meter, said memory being external-read protected, and said first password being generated by processing a first software key and a serial number of said meter with a first authentication algorithm by a processor external to said meter, (3) pre-storing said serial number in said memory of the meter, and, (4) activating said upgrade to allow use thereof, said step of activating said upgrade comprising the steps of, a. reading said serial number from said memory of the meter with an external processor, b. reading a second software key from an external hardware device connected to said external processor, said second software key being the same as said first software key, c. generating a second password with said external processor, by processing said second software key and said read serial number with a second authentication algorithm stored in a memory of said external processor, said second authentication algorithm being the same as said first authentication algorithm, d. presenting said second password and an upgrade command stored in said memory of said external processor to the meter, and e. comparing said first and second passwords in an internal processor of the meter, and in response to said upgrade command, activating said upgrade if said first and second passwords match.

2. The method of claim 1 wherein:

said first authentication algorithm comprises the steps of, (1) initializing a first array of bytes with said first software key and said serial number to provide a first initialized array, said serial number including an option byte, and (2) cycling said first initialized array to provide said first password; and said second authentication algorithm comprises the steps of, (1) initializing a second array of bytes with said second software key and said read serial number, including said option byte, to provide a second initialized array, and (2) cycling said second initialized array to provide said second password.

3. The method of claim 2 wherein:

said step of initializing said first array comprises the steps of,
   (1) placing said option byte in a first byte of said first array,
   (2) placing bytes of said first software key into remaining sequential following odd or even bytes of said first array, and
   (3) placing bytes of said serial number into remaining sequential following other odd or even bytes of said first array; and said step of initializing said second array comprises the steps of,
   (1) placing said option byte in a first byte of said second array,
   (2) placing bytes of said second software key into remaining sequential following odd or even bytes of said second array, and
   (3) placing bytes of said read serial number into remaining sequential following other odd or even bytes of said second array.

4. The method of claim 2 wherein:

said step of cycling said first initialized array comprises the steps of,
   (1) computing a bit-by-bit modulo two sum of selected bytes in said first array,
   (2) summing said computed bit-by-bit modulo two sum to a first constant to generate a first sum,
   (3) end-around rotating said first sum,
   (4) placing the contents of each byte of said first array in the previous byte of said first array, and
   (5) repeating steps (1)–(4) of said step of cycling said first initialized array for a first plurality of cycles; and said step of cycling said second initialized array comprises the steps of,
   (1) computing a bit-by-bit modulo two sum of selected bytes in said second array,
   (2) summing said computed bit-by-bit modulo two sum to a second constant to generate a second sum, said second constant being the same as said first constant,
   (3) end-around rotating said second sum,
   (4) placing the contents each byte of said second array in the previous bit of said second array, and
   (5) repeating steps (1)–(4) of said step of cycling said second initialized array for a second plurality of cycles, said second plurality of cycles being the same as said first plurality of cycles.

5. The method of claim 2 wherein:

said step of cycling said first initialized array comprises the steps of,
   (1) performing a bitwise exclusive-or on all the bytes in said first array,
   (2) summing said bitwise exclusive-or to a first constant to generate a first sum,
   (3) end-around rotating said first sum,
   (4) placing the contents each byte of said first array in the previous bit of said first array, and
   (5) repeating steps (1)–(4) of said step of cycling said first initialized array for a first plurality of cycles; and said step of cycling said second initialized array comprises the steps of,
   (1) performing a bitwise exclusive-or on all the bytes in said second array,
   (2) summing said bitwise exclusive-or to a second constant to generate a second sum, said second constant being the same as said first constant,
   (3) end-around rotating said second sum,
   (4) placing the contents each byte of said second array in the previous bit of said second array, and
   (5) repeating steps (1)–(4) of said step of cycling said second initialized array for a second plurality of cycles, said second plurality of cycles being the same as said first plurality of cycles.

6. The method of claim 1 wherein said step of activating said upgrade further comprises the step of:
   (6) decrementing a counter each time an upgrade activated from said external processor.

7. The method of claim 1 wherein said external processor comprises a computer.

8. The method of claim 1 wherein said external hardware device comprises a hardware key.

9. A method of authentication comprising the steps of:

initializing an array of bytes with a software key and a serial number to provide an initialized array, said serial number including an option byte;

cycling said initialized array to provide a password; and using said password for authentication.

10. The method of claim 9 wherein said step of initializing said array comprises the steps of:
   (1) placing said option byte in a first byte of said array;
   (2) placing bytes of said software key into remaining sequential following odd or even bytes of said array; and
   (3) placing bytes of said serial number into remaining sequential following other odd or even bytes of said array.

11. The method of claim 9 wherein said step of cycling said initialized array comprises the steps of,
   (1) computing a bit-by-bit modulo two sum of selected bytes in said array;
   (2) summing said computed bit-by-bit modulo two sum to a constant to generate a sum;
   (3) end-around rotating said sum;
   (4) placing the contents each byte of said array in the previous bit of said array; and
   (5) repeating steps (1)–(4) of said step of cycling said initialized array for a plurality of cycles.

12. The method of claim 9 wherein said step of cycling said initialized array comprises the steps of:
   (1) performing a bitwise exclusive-or on all the bytes in said array;
   (2) summing said bitwise exclusive-or to a constant to generate a sum;
   (3) end-around rotating said sum;
   (4) placing the contents each byte of said array in the previous bit of said array; and
   (5) repeating steps (1)–(4) of said step of cycling said initialized array for a plurality of cycles.

13. An electricity meter comprising:
   (1) electricity measuring circuitry for generating measured signals indicative of electricity being metered;
   (2) a processor for responsive to said measured signals, and having a memory for storing:
      signals including program signals defining a first executable algorithm for calculating electricity usage,
      upgrade signals defining a second executable algorithm for performing an upgrade feature, serial number signals indicative of a serial number of the meter, and password signals used to allow activation of said upgrade feature, said password signals being external read protected, said password signals being generated by a processor with an authentication algorithm external to said meter by processing a software key and said serial number; and (3) a port for communications with an external device.

14. The meter of claim 13 wherein said authentication algorithm comprises:

an array of bytes being initialized with said software key and said serial number, to provide an initialized array, said serial number including an option byte; and said initialized array being cycled to provide a password.

15. The meter of claim 14 wherein said initialized array comprises:

said option byte in a first byte of said array;

bytes of said software key in remaining sequential following odd or even bytes of said array; and bytes of said serial number in remaining sequential following other odd or even bytes of said array.

16. The meter of claim 14 wherein said cycling said initialized array comprises:

(1) computing a bit-by-bit modulo two sum of selected bytes in said array;

(2) summing said computed bit-by-bit modulo two sum to a constant to generate a sum;

(3) end-around rotating said sum;

(4) placing the contents each byte of said array in the previous bit of said array; and (5) repeating (1)-(4) for a plurality of cycles.

17. The meter of claim 14 wherein said cycling said initialized array comprises:

(1) performing a bitwise exclusive-or on all the bytes in said array;

(2) summing said bitwise exclusive-or to a constant to generate a sum;

(3) end-around rotating said sum;

(4) placing the contents each byte of said array in the previous bit of said array; and (5) repeating (1)-(4) for a plurality of cycles.

18. An apparatus for providing upgrades comprising:

an electricity meter comprising, (1) electricity measuring circuitry for generating measured signals indicative of electricity being metered, (2) a first processor responsive to said measured signals, having a first memory for storing first signals including first program signals defining a first executable algorithm for calculating electricity usage, storing second program signals defining a second executable algorithm for performing an upgrade feature, storing serial number signals indicative of a serial number of the meter, and storing first password signals indicative of a password, said first password signals being external read protected, said first password signals indicative of a password determined by processing a software key and said serial number with an authentication algorithm, and (3) a port for communications;

upgrade apparatus external to said electricity meter comprising, a. a second processor connected to said port of said meter for communicating with said meter to read said serial number therefrom b. a hardware key having a second memory for storing software key signals indicative of said software key, said second processor having said hardware key connected thereto for communicating with said hardware key to read said software key therefrom, said processor having a third memory for storing second signals including third program signals defining a third executable algorithm for processing said read software key and said read serial number with said authentication algorithm to generate second password signals indicative of said password, said third memory for storing upgrade command signals, said second processor for communicating with said meter to present said second password signals and said upgrade command signals thereto; and said first processor of said meter for communicating with said upgrade apparatus to read said second password signals and said upgrade command signals presented thereto, said first memory of said first processor for storing fourth program signals defining a fourth executable algorithm for comparing said first password signals with said second password signals, and applying said upgrade command signals to said second executable algorithm to activate said upgrade feature.

19. The apparatus of claim 18 wherein said authentication algorithm comprises:

an array of bytes being initialized with said software key and said serial number, to provide an initialized array, said serial number including an option byte; and said initialized array being cycled to provide said password.

20. The apparatus of claim 19 wherein said initialized array comprises:

said option byte in a first byte of said array;

bytes of said software key in remaining sequential following odd or even bytes of said array; and bytes of said serial number in remaining sequential following other odd or even bytes of said array.

21. The apparatus of claim 19 wherein said cycling said initialized array comprises:

(1) computing a bit-by-bit modulo two sum of selected bytes in said array;

(2) summing said computed bit-by-bit modulo two sum to a constant to generate a sum;

(3) end-around rotating said sum;

(4) placing the contents each byte of said array in the previous bit of said array; and (5) repeating (1)-(4) for a plurality of cycles.

22. The apparatus of claim 19 wherein said cycling said initialized array comprises:

(1) performing a bitwise exclusive-or on all the bytes in said array;

(2) summing said bitwise exclusive-or to a constant to generate a sum;

(3) end-around rotating said sum;

(4) placing the contents each byte of said array in the previous bit of said array; and (5) repeating (1)-(4) for a plurality of cycles.

* * * * *